United States Patent

Emch

[15] 3,697,990
[45] Oct. 10, 1972

[54] METHOD AND APPARATUS FOR PRODUCING TARGET RANGE, HEIGHT, AND ELEVATION VOLTAGES FROM A PPI DISPLAY

[72] Inventor: George F. Emch, Silver Spring, Md.

[73] Assignee: The United States of America as represented by the Secretary of the Navy

[22] Filed: April 27, 1970

[21] Appl. No.: 32,246

[52] U.S. Cl. .................................343/6 R, 343/5 R
[51] Int. Cl. ..............................G01s 7/64, G01s 9/02
[58] Field of Search..................................343/5 R, 6

[56] References Cited

UNITED STATES PATENTS 3,129,402   4/1964   Henne.....................343/5 R X
3,181,154   4/1965   Henne.....................343/5 R X Primary Examiner—Malcolm F. Hubler
Attorney—Richard S. Sciascia and J. A. Cooke

[57] ABSTRACT

A method and apparatus for producing target elevation, range, and height information. The video display of a target display device is sensed by a video display sensor and applied to first and second sample and hold circuits. The output of the first sample and hold circuit is a signal indicative of target elevation. The output of the second sample and hold circuit is a signal indicative of target range. The output of the first sample and hold circuit is also fed into a sine generator, the output of which when multiplied with the output of the second sample and hold circuit is a signal indicative of target height.

24 Claims, 6 Drawing Figures

INVENTOR.
GEORGE F. EMCH

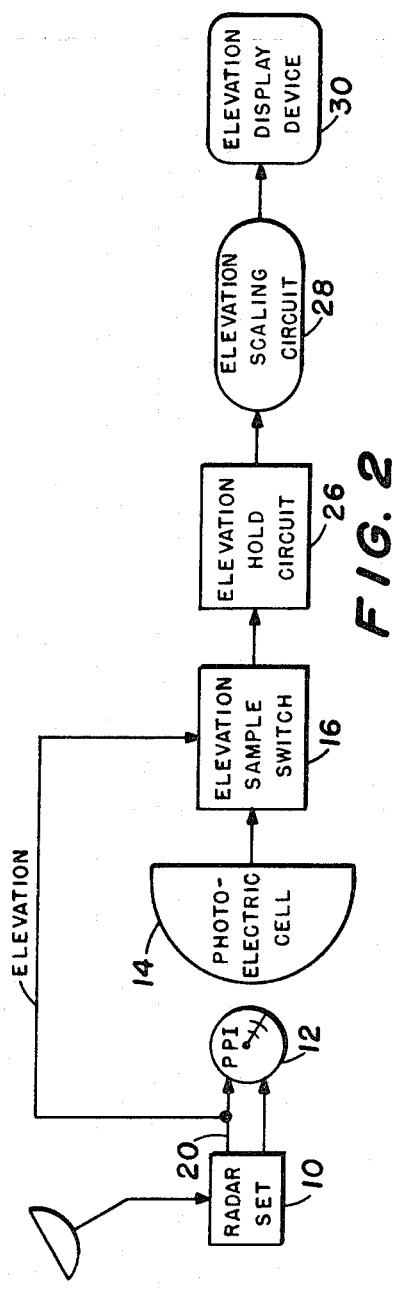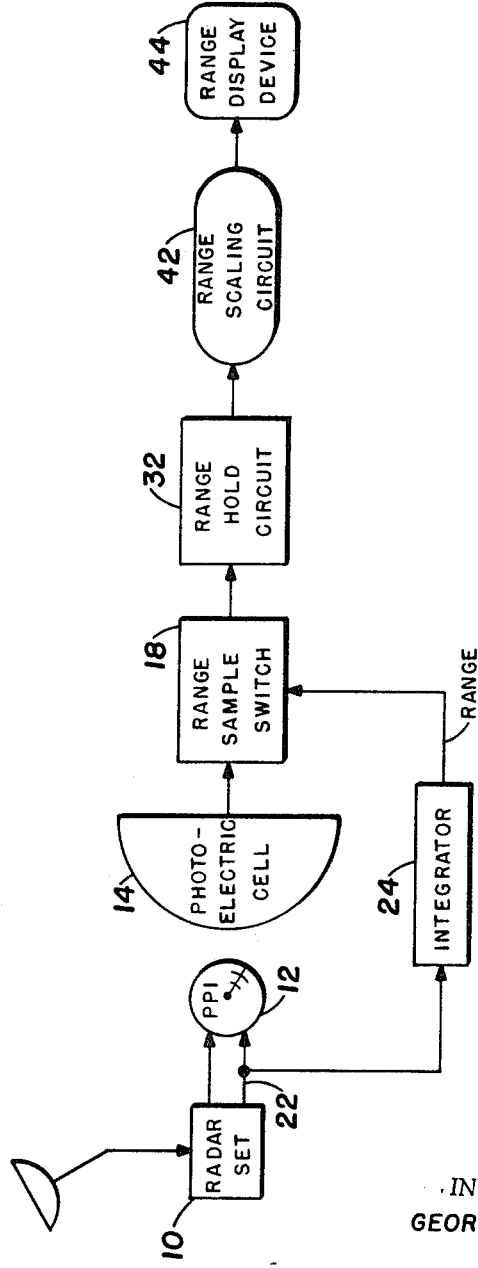
FIG. 2
FIG. 3
INVENTOR.
GEORGE F. EMCH

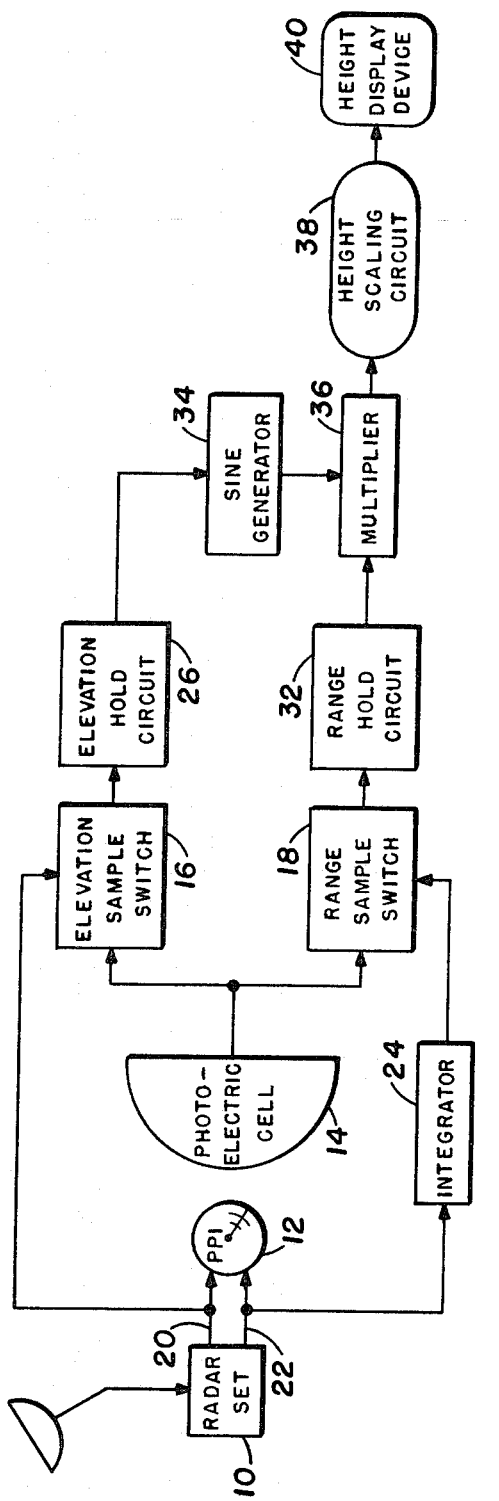

INVENTOR.
GEORGE F. EMCH

METHOD AND APPARATUS FOR PRODUCING TARGET RANGE, HEIGHT, AND ELEVATION VOLTAGES FROM A PPI DISPLAY

BACKGROUND OF THE INVENTION

This invention relates generally to a method and apparatus for determining target elevation, range, and height and it more particularly relates to a method and apparatus which utilizes the video display of a target display device, a video display sensor and a pair of sample and hold circuits to ascertain target elevation, range, and height.

In the past many systems have been devised that utilize optical sensing devices responding to target displays for determining target information. However, quite often such systems would have physical restraints, i.e. the data would have to be in a coded format, or perhaps the system would require the use of reference signals in order to present a valid or intelligible output. Additionally, some systems would require the use of such complicated optical devices as focusing lens, diverging lens, etc. Most frequently however, prior art systems FOR determining target information would be accompanied with extensive mechanical embodiments as well as detailed electronic circuitry As a result, therefore, prior art systems would usually be associated with a large financial investment as well as a large degree of training and understanding of the operation of said systems.

SUMMARY OF THE INVENTION

In summary, the subject invention utilizes a video display sensor such as a photoelectric cell to sense the presence of a target as represented by a video brightening of a target display device such as a Plan Position Indicator (PPI). The signal emerging from said video display sensor is fed in parallel to first and second sample switches. Also being applied continuously to said first and second sample switches are radar elevation and range information signals respectively. The first sample switch applies to a first hold circuit only those portions of the radar elevation signal that are present when said sample switch is being activated by the signal emergent from said video display sensor. The output of said first holding circuit is a signal indicative of target elevation. As mentioned above, the output of said video display sensor is also fed to a second sample switch that is also receiving target range information. The sample switch will pass to a second hold circuit only those portions of said target range information signal that are present when said second sample switch is being activated by said signal emergent from said video display sensor. The output of said second hold circuit is a signal indicative of target range. To obtain height information the output of said second hold circuit is multiplied by the sine function of said elevation signal. Emergent from said multiplier is a signal indicative of target height.

It is an object of the instant invention to provide a method and apparatus for determining target elevation, range, and height information from the video display of a PPI.

It is another object therefore of the present invention to provide a method and apparatus for determining target information in a simple and straightforward manner.

It is another object of the instant invention to provide an inexpensive method of determining target information.

It is another object of this invention to provide a method and apparatus for determining target information through the use of a photoelectric cell and sample and hold circuits.

BRIEF DESCRIPTION OF THE DRAWINGS

Further objects and many of the attendant advantages thereof will be readily appreciated as the same becomes better understood by reference to the following detailed description when considered in conjunction with the accompanying drawings, in which:

FIG. 2 is a block diagram of one embodiment of that portion of the subject invention which produces target elevation;

FIG. 3 is a block diagram of one embodiment of that portion of the subject invention that produces target range;

FIG. 4 is a block diagram of one embodiment of that portion of the subject invention that produces target height;

Figure 1:
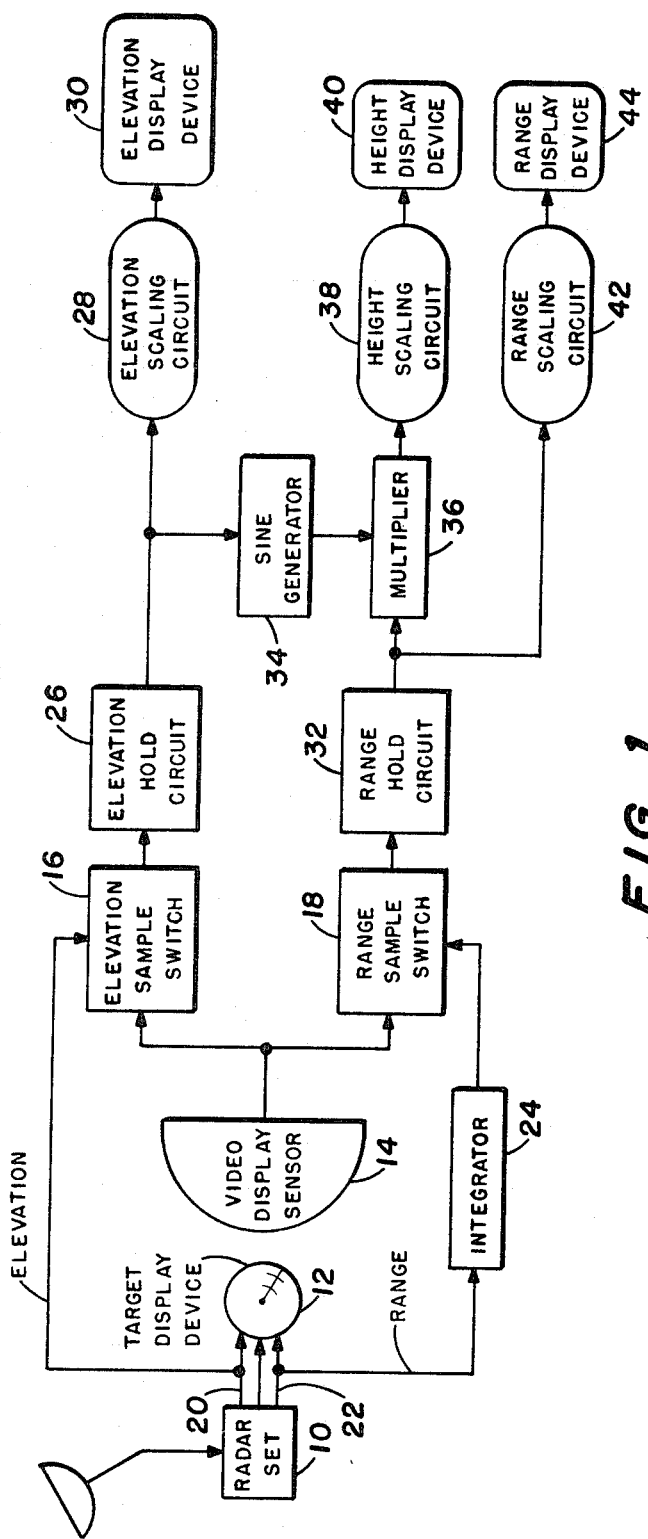
FIG. 1 is a block diagram of the subject invention illustrating the simultaneous measurements of elevation, range, and height.

Referring now to the block diagram of the proposed invention in FIG. 1, targets detected by the radar set 10, are displayed on target display device 12. Video display sensor 14 detects the video brightenings of target display device 12 and feeds in parallel sample switches 16 and 18. Sample switch 16 also receives target elevation information from output 20 of radar set 10. Sample switch 18 receives target range information from output 22 of radar set 10. The target range signals received by sample switch 18 are integrated by integrator 24. The sampled output of sample switch 16 is fed to elevation hold circuit 26. This signal is displayed on elevation display device 30 after correct scaling by elevation scaling circuit 28. The output of sample switch 18 is applied to range hold circuit 32 which feeds in parallel one input of multiplier 36 and range scaling circuit 42. The output of range scaling circuit 42 is applied to range display device 44. Referring back now to multiplier 36 the other input to said multiplier is the output of sine generator 34. The output of multiplier 36 is applied to height display device 40 after proper interfacing by height scaling circuit 38.

The above broadly described invention will be hereinafter discussed in the embodiment shown in FIGS. 2, 3, and 4 which utilizes a PPI for target display device 12, a photoelectric cell for video display sensor 14 and analog inputs for sample switches 16 and 18. Referring now to FIG. 2, targets detected by radar set 10 are displayed in video form on PPI 12, a device well-known in the art. In order to display target position with any degree of accuracy, the PPI also receives radar antenna elevation and target range information. Thus the PPI indicates target presence by a video brightening of that portion of the PPI video display relating to a particular range and elevation. More precisely, range is determined by measuring the distance from the center of the PPI scope, known in the art as the main-bang point, to the brightened spot. The angular position of the radar antenna is determined by the circular position of said brightened spot.

Given this background, the process of displaying elevation, range, and height measurements will now be explained. As mentioned before whenever a target is detected by the radar set, this is indicated on the PPI by a visual brightening. This visual brightening is detected by photoelectric cell 14 thereupon emitting a pulse whose duration corresponds to the brightening time of the PPI. The emitted pulse serves to close sample switch 16. The amount of time, switch 16 is closed is determined by the width of the emitted pulse. The waveforms of FIG. 5a will be periodically referred to in the explanation of the proposed invention of FIG. 2. The visual brightening of the PPI scope is illustrated by waveform $a$ of FIG. 5a. Time $T_o$ represents the beginning of the PPI sweep or main-bang time. AT time $T_1$ target detection begins, ending at time $T_2$. Therefore the output of the photoelectric cell is a pulse of width $T_2-T_{1a}$¼as illustrated in waveform $b$. This pulse will close sample switch 16 for that same time period. Radar elevation information, shown in waveform $c$, is continuously being applied to sample switch 16. Thus when the pulse of waveform $b$ closes sample switch 16 for the time period $T_2-T_1$, the signal of waveform $d$ is admitted through sample switch 16 to elevation hold circuit 26. The function of elevation hold circuit 26 is to detect the voltage level of the pulse of waveform $d$ at time $T_2$ and upon detecting said voltage level to hold said voltage level for a predetermined length of time as illustrated by waveform $e$. Thus, the signal of waveform $e$ is a D.C. voltage level whose amplitude corresponds to the elevation value received at time $T_2$. This D.C. voltage level is visually presented by elevation display device 30 which could be a plurality of devices, e.g. a meter whose face is calibrated in degrees of elevation or an oscillograph whose graphic increments are marked in degrees of elevation. The output of elevation display device 30 is shown by waveform $f$. Elevation scaling circuit 28 is utilized to provide the proper interface requirements between the D.C. output of elevation hold circuit 26 and elevation display device 30.

Referring now to the waveforms of FIG. 5b in conjunction with the block diagram of FIG. 3, the determination of target range will be discussed. The output of the photoelectric cell, as illustrated by waveform $g$, is produced in the same manner as described hereinabove. The pulse of waveform $g$ is applied to sample switch 18 thereby closing said switch for the duration $T_2-T_1$. Continuously applied to sample switch 18 is radar range information obtained from output 22 of the radar set 10. The radar range information signal, as shown in waveform $h$, is a pulse denoting the main-bang time. Thus the minimum range is denoted at time $T_o$ and the maximum range would be identified just prior to time $T_3$. The signal of waveform $h$ is integrated by integrator 24 to provide the desired sawtooth signal of waveform $i$ which is continuously applied to sample switch 18. That portion of the signal of waveform $i$ that is present during the signal of waveform $g$ is applied to range hold circuit 32. The input signal subsequently applied to range hold circuit 32 is shown by waveform $j$. The output of range hole circuit 32, illustrated by waveform $k$ is a D.C. voltage level which is produced in the same manner as the signal of waveform $e$ of FIG. 5a. The output of range hold circuit 32 is fed in parallel to one input of a two input multiplier (not shown) and to range scaling circuit 42. The output of the range scaling circuit is shown by waveform $l$ which is a D.C voltage level corresponding to values of range. This signal is thereupon displayed by range display device 44.

Figure 5A:
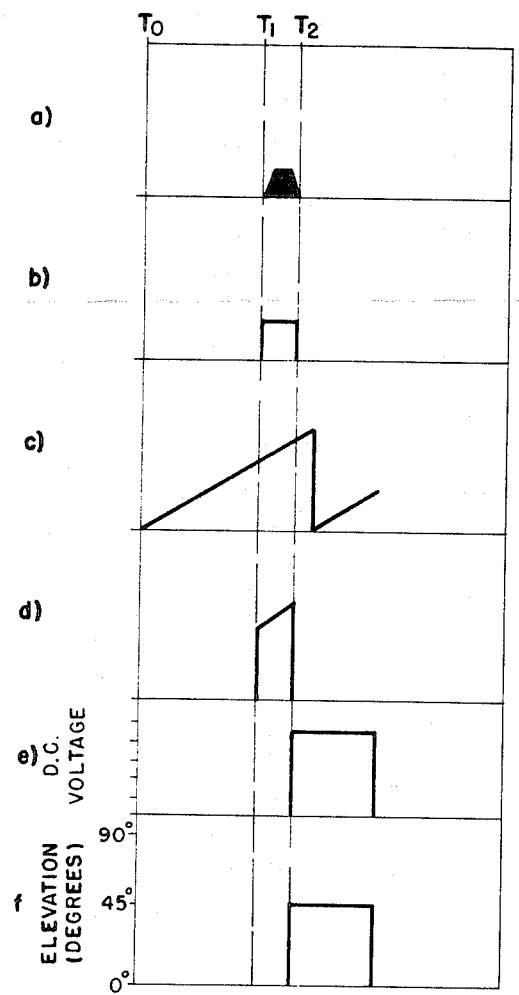
FIGS. 5a and 5b illustrate the output waveforms of the various components of the subject invention.
Figure 5B:
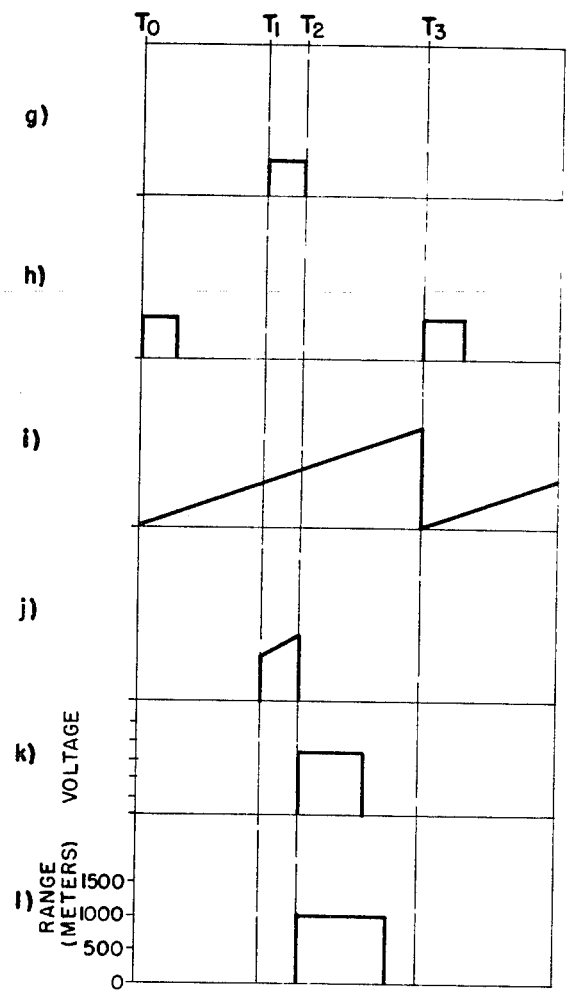

Referring now to FIGS. 4, 5a, and 5b, the determination of target height will be explained. The D.C. voltage level output of elevation hold circuit 26 is producing in the same manner as previously described. This signal, waveform $e$ of FIG. 5a, is applied to sine generator 34. The output of sine generator, represented as sin E, is applied to one input of two input multiplier 36. The other input of multiplier 36 receives the D.C. voltage level output of range hold circuit 32, waveform $k$ of Fig. 5b. Thus if the output of sine generator 34 may by represented as sine E then the output of multiplier 36 can be represented as R sin E which is the definition of height. Target height, as produced by multiplier 36, is displayed on height display device 40. Again the necessary interface requirements between the output of the multiplier and the height display device is satisfied by height scaling circuit 38.

In view of the foregoing discussion, it will be seen that the use of a video display sensor and sample and hold circuits in conjunction with the visual display of a target display device as proposed in accordance with the present invention, has certain obvious advantages over conventional techniques. In general, the simplicity of the proposed method and apparatus considerably reduces the efforts and costs associated with the determination of target elevation, range and height.

What is claimed is:

1. In a target detection and display system including a radar set for detecting target presence, and a target display device, the method of producing the elevation of said target comprising the steps of:
    sensing the video display of said target display device;
    generating a signal upon sensing said video display;
    applying said generated signal to a first input of a sample switching means;
    applying a radar elevation signal to the second input of said switching means;
    passing that portion of said radar elevation signal that is present during the occurrence of said generated signal;
    converting said passed elevation signal to a D.C. voltage level, said D.C. voltage level being indicative of target elevation.

2. The method of claim 1 further comprising the steps of displaying said D.C. voltage level on a device that correlates D.C. voltage levels with degrees of elevation.

3. The method of claim 1 wherein said target display device is a Plan Position Indicator.

4. The method of claim 1 wherein said video display sensor is a photoelectric cell.

5. In a target detection and display system including a radar set for detecting target presence and a target display device, the method of producing the range of said target comprising the steps of:
    sensing the video display of said target display device;

generating a signal upon sensing said video display;
applying said generated signal to a first input of a sample switching means;
applying a radar range signal to the second input of said switching means;
passing that portion of said radar range signal that is present during the occurrence of said generated signal;
converting said passed range signal to a D.C. voltage level, said D.C. voltage level being indicative of target range.

6. The method of claim 5 further comprising the step of displaying said D.C. voltage level on a device that correlates D.C. voltage levels with range.

7. The method of claim 5 wherein said target display device is a Plan Position Indicator.

8. The method of claim 5 wherein said video display sensor is a photoelectric cell.

9. In a target detection and display system including a radar set for detecting target presence and a target display device, the method of producing the height of said target comprising the steps of:
sensing the video display of said target display device;
generating a signal upon sensing said video display;
applying said generated signal to a first input of a first and second sample switching elements;
applying a radar elevation signal to a second input of said first switching means;
applying a radar range signal to a second input of said second switching means;
passing that portion of said radar elevation signal that is present during the occurrence of said generated signal;
converting said passed elevation signal to a D.C. voltage level, said D.C. voltage level being indicative of target elevation;
passing that portion of said radar range signal that is present during the occurrence of said generated signal;
converting said passed range signal to a D.C. voltage level, said D.C. voltage level being indicative of target range;
converting said elevation D.C. voltage level signal into a signal that is the sine of said elevation D.C. signal;
applying said elevation sine signal to one input of a two input multiplier;
applying said D.C. range signal to a second input of said multiplier;
multiplying said elevation sine first input signal with said range second input to produce a D.C. voltage level signal indicative to target height.

10. The method of claim 9 further comprising the step of displaying said height D.C voltage level signal on a device that correlates D.C. voltage levels height.

11. The method of claim 5 wherein said target display device is a Plan Position Indicator.

12. The method of claim 5 wherein said video display sensor is a photoelectric cell.

13. In a target detection and display system including a radar set for detecting target presence and a target display device, apparatus for producing target elevation, comprising:
means for sensing the video display of said target display device;
means for generating a signal upon sensing said video display;
a sample switch having first and second inputs, said first input receiving said generated signal and said second input continuously receiving radar elevation signals, whereby said switch will pass only that portion of said second input during the presence of said first input;
means for converting the output of said sample switch to a D.C. voltage level, said D.C. voltage level being indicative of target elevation.

14. The apparatus as claimed in claim 13 further comprising means for visually displaying said D.C. elevation signal in degrees of elevation.

15. The apparatus as claimed in claim 13 wherein said target display device is a plan Position Indicator.

16. The apparatus as claimed in claim 3 wherein said video display sensor is a photoelectric cell.

17. In a target detection and display system including a radar for detecting target presence and a target display device, apparatus for producing target range, comprising:
means for sensing the display of said plan target display device;
means for generating a signal upon sensing said video display;
a sample switch having first and second inputs, said first input receiving said generated signal and said second input continuously receiving radar range signals whereby said switch will pass only that portion of said second input during the presence of said first input;
means for converting the output of said sample switch to a D.C. voltage level, said D.C. voltage level being indicative of target range.

18. The apparatus as claimed in claim 17 further comprising means for visually displaying said D.C. range signal in values of range.

19. The apparatus as claimed in claim 18 wherein said target display device is a Plan Position Indicator.

20. The apparatus as claimed in claim 18 wherein said video display sensor is a photoelectric cell.

21. In a target detection and display system including a radar set for detecting target presence and a target display device, apparatus for producing the target height, comprising:
means for sensing the display of said target display device;
means for generating a signal upon sensing video display;
a first sample switch having first and second inputs, said first input receiving said generated signal and said second input continuously receiving radar elevation signals, whereby said first switch will pass only that portion of said second input during the presence of said first input;
means for converting the output of said sample switch to a D.C. voltage level, said D.C. voltage level being indicative of target elevation;
a second sample switch having first and second inputs, said first input receiving said generated signal and said second input continuously receiving radar range signals whereby said switch will pass only that portion of said second input during the presence of said first input;

means for converting the output of said second sample switch to a D.C. voltage level, said D.C. voltage level being indicative of target range;

means for converting the elevation D.C. voltage level signal into a signal representative of the sine of said elevation D.C. voltage level;

means for multiplying said elevation signal with the said D.C. range signal thereby producing a signal indicative of target height.

22. The apparatus as claimed in claim 21 further comprising means for visually displaying said height signal.

23. The apparatus as claimed in claim 21 wherein said target display device is a Plan Position Indicator.

24. The apparatus as claimed in claim 21 wherein said video display sensor is a photoelectric cell.

* * * * *